United States Patent [19]

Lee et al.

[11] Patent Number: 5,212,277

[45] Date of Patent: May 18, 1993

[54] POLYETHERIMIDEIMIDES AND A METHOD FOR MANUFACTURING THEM

[75] Inventors: Kwang-Sup Lee; Kil-Yeong Choi; Jong C. Won, all of Taejeon; Byoung K. Park, Seoul; In-Tae Lee, Kyungki, all of Rep. of Korea

[73] Assignees: Korea Research Institute of Chemical Technology, Taejeon; Cheil Industries, Inc., Daegu, both of Rep. of Korea

[21] Appl. No.: 638,992

[22] Filed: Jan. 10, 1991

[30] Foreign Application Priority Data

May 15, 1990 [KR] Rep. of Korea ............ 90-6881

[51] Int. Cl.$^5$ .......... C08G 73/10; C08G 8/02; C08G 14/00
[52] U.S. Cl. ............ 528/170; 528/125; 528/126; 528/128; 528/171; 528/173; 528/174; 528/176; 528/179; 528/188; 528/189; 528/220; 528/229; 528/351; 528/352; 528/353
[58] Field of Search .......... 528/125, 126, 128, 170, 528/174, 173, 176, 179, 351, 353, 220, 352, 229, 188, 189, 171

[56] References Cited

U.S. PATENT DOCUMENTS

| | | | |
|---|---|---|---|
| 4,024,101 | 5/1977 | Takekoshi | 528/125 |
| 4,048,142 | 9/1977 | Takekoshi | 528/125 |
| 4,524,171 | 6/1985 | Bakshi | 528/125 |
| 4,540,748 | 9/1985 | Matzner | 528/126 |
| 4,612,361 | 9/1986 | Peters | 528/188 |
| 4,622,368 | 11/1986 | Verbicky, Jr. | 524/401 |
| 4,906,730 | 3/1990 | Takekoshi et al. | 528/353 |

Primary Examiner—John Kight, III
Assistant Examiner—P. Hampton-Hightower
Attorney, Agent, or Firm—Cushman, Darby & Cushman

[57] ABSTRACT

The present invention relates to new polyetherimideimides having imideimide group with the following structural formula(I) and inherent viscosity of 0.27~0.71 dl/g, which can be made by effecting reaction between an aromatic bis(ether anhydride) and an organic diamine or an aromatic bis(nitro imideimide) and a metal salt of diol.

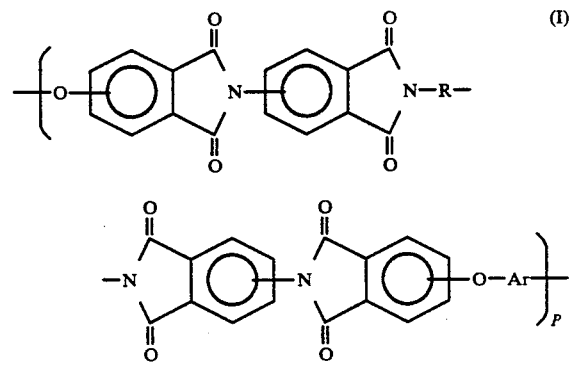

Wherein, R is

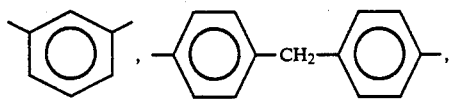

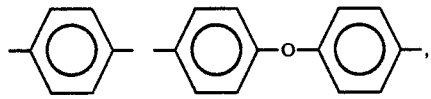

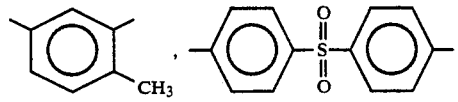

or

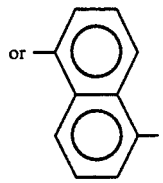

5 Claims, No Drawings

POLYETHERIMIDEIMIDES AND A METHOD FOR MANUFACTURING THEM

BACKGROUND OF THE INVENTION

1. Field of Invention

This present invention relates to new polyetherimideimides as following structural formula(I), which can be made by effecting reaction between an aromatic bis(ether anhydride) and an organic diamine or an aromatic bis(nitro imideimide) and a metal salt of diol.

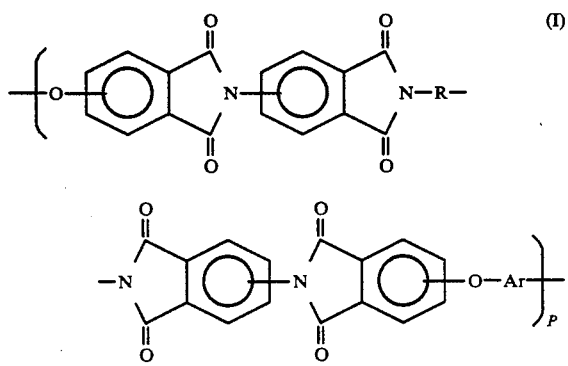

Wherein, R is

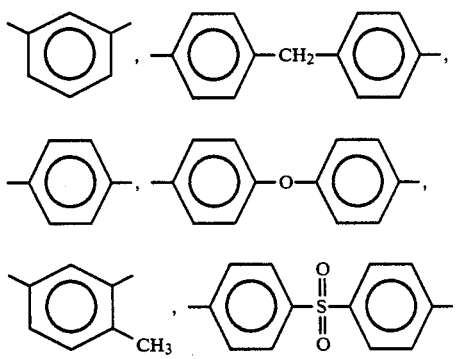

Ar is selected from alkyl or phenyl derivatives with 6 to 12 carbons, and p is integral number between 10 and 1000.

2. Description of Related Art.

Engineering plastic describes plastic as having properties of broad range of temperature, of good mechanical stress, and of being used as structure products under severe physical and chemical conditions for a long time, so having industrial utility as basic materials of many industrial accessories.

Engineering plastic has discovered many practical uses which utilize plastic as a basic material instead of metal, wood and ceramic in the today's automobil, airplane, electrics, electronics and precision instruments, by improving many of the disadvantages of common plastics, which include low heat-resistance, low chemical-resistance, incombustibility, lack of hardness, poor electrical and mechanical properties, but still maintaining the advantage of flexibility easy to process.

Polyimide is one of the polymers which has excellent heat-resistance and which was first synthesized by Bogard and Renshaw in 1908 [T. M. Bogard and R. R. Renshaw, J. Am. Chem. Soc., 30, 1140 (1908)]

Prior to the present invention polyimides were generally made from a polyamide acid intermediate. As shown by Edwards U.S. Pat. No. 3,179,614, the polyamide acid is preferably obtained by reacting the organic dianhydride and the organic diamine with a dipolar aprotic solvent at temperatures of 50° C. or below. One of the reasons for careful temperature control is that premature formation of water of reaction leads to depolymerization of polymer. In addition, imidization occurs as soon as the temperature exceeds optimum limits which can decrease polymer solubility and solution shelf life. Polyimides are intractable and decompose before they can be melted. At best, the more readily processable polyamide acid can be converted to a film or coating. Therefore, numerous investigations have been carried out to develop heat-resistant resins which have a high glass transition temperature and can be processed over that glass transition temperature.

The origin of these investigations came about with the introduction of the polyetherimide. Polyetherimides are those having-o-(ether) bonds which provide flexibility to the polyimide structure and may have a variety of molecular structures depending on the raw materials used, among which, as shown in the structural formula(A), which is prepared by an imidization reaction using aromatic bis(etheranhydride) and organic diamine.

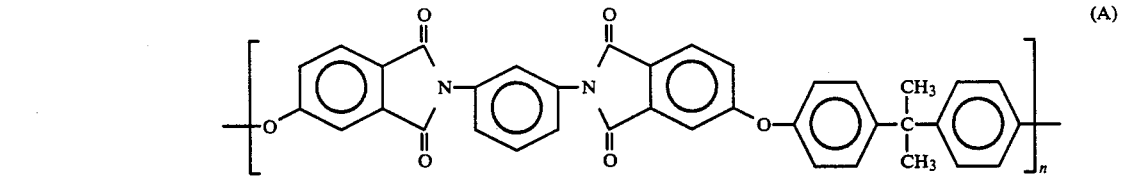

The present invention is based on the polyetherimide that an imide function is additionally inserted still retaining phthalimide function and ether function. There is provided by the present invention, a method for making polyetherimideimides which are proivded improved properties as compared to existing resins.

SUMMARY OF THE INVENTION

The present invention is characterized by a polyetherimideimide having imide-imide group with the above structural formula(I) and inherent viscosity($\eta_{inh}$) of 0.27~0.71 dl/g.

DESCRIPTION OF THE PREFERRED EMBODIMENT

The present invention is based on the discovery that reaction between substantially equal molar amount of diamine having phthalimide group of the following structural formula(II) and aromatic bis(ether anhydride) of the following structural formula(III), wherein polymerization may be solution and melt polymerization.

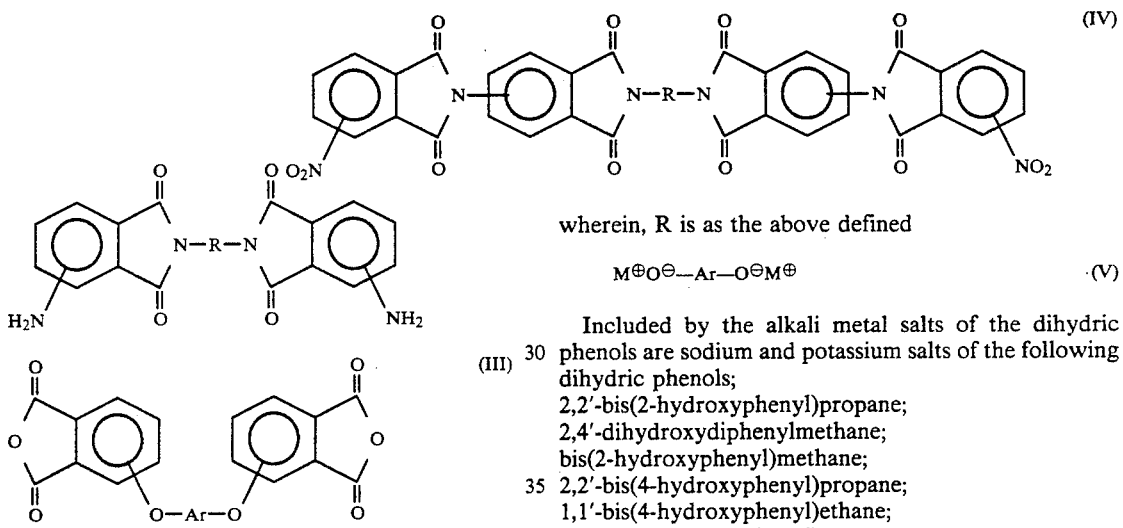

Included by the organic diamines of formula(II), are for example, 1,3-bis(4-aminophthalimido)benzene;
4,4'-bis(4-aminophthalimido)diphenylmethane;
4,4'-bis(4-aminophthalimido)diphenylether;
1,4-bis(4-aminophthalimido)benzene;
4,4'-bis(4-aminophthalimido)diphenylsulfone;
1,5-bis(4-aminophthalimido)naphthalene;
1,3-bis(4-aminophthalimido)-4-methylbenzene;
1,3-bis(3-aminophthalimido)benzene;
4,4'-bis(3-aminophthalimido)diphenylmethane;
4,4'-bis(3-aminophthalimido)diphenylether;
1,4-bis(3-aminophthalimido)diphenylsulfone;
1,5-bis(3-aminophthalimido)naphthalene;
1,3-bis(3-aminophthalimido)-4-methylbenzene; etc.

Dianhydrides included by formula (III) are, for example, 2,2'-bis[4-(2,3-dicarboxyphenoxy)phenyl] propane dianhydride;
4,4'-bis(2,3-dicarboxyphenoxy)diphenylether dianhydride;
1,3-bis(2,3-dicarboyphenoxy)benzene dianhydride;
4,4'-bis(2,3-dicarboxyphenoxy)diphenylsulfide dianhydride;
1,4-bis(2,3-dicarboxyphenoxy)benzene dianhydride;
4,4'-bis(2,3-dicarboxyphenoxy)benzophenone dianhydride;
4,4'-bis(2,3-dicarboxyphenoxy)diphenylsulfone dianhydride;
2,2'-bis[4-(3,4-dicarboxyphenoxy)phenyl] propane dianhydride;
4,4'-bis(3,4-dicarboxyphenoxy)diphenylether dianhydride;
1,3-bis(3,4-dicarboxyphenoxy)benzene dianhydride;
4,4'-bis(3,4-dicarboxyphenoxy)diphenylsulfide dianhydride;
1,4-bis(3,4-dicarboxyphenoxy)benzene dianhydride;
4,4'-bis(3,4-dicarboxyphenoxy)benzophenone dianhydride;
4-(2,3-dicarboxyphenoxy)-4'-(3,4-dicarboxyphenoxy)-diphenyl-2,2'-propane dianhydride; etc.

In addition to the a foregoing method, polyetherimideimide of this invention may be synthesized by the imidization method, or a nucleophilic substitution reaction with dinitrophthalimideimide of the formula (IV) and metal salts of diol of the formula (V).

wherein, R is as the above defined $$M^{\oplus}O^{\ominus}-Ar-O^{\ominus}M^{\oplus} \quad (V)$$

Included by the alkali metal salts of the dihydric phenols are sodium and potassium salts of the following dihydric phenols;

2,2'-bis(2-hydroxyphenyl)propane;
2,4'-dihydroxydiphenylmethane;
bis(2-hydroxyphenyl)methane;
2,2'-bis(4-hydroxyphenyl)propane;
1,1'-bis(4-hydroxyphenyl)ethane;
1,1'-bis(4-hydroxyphenyl)propane;
2,2'-bis(4-hydroxyphenyl)pentane;
3,3-bis(4-hydroxyphenyl)pentane;
4,4'-dihydroxybiphenyl;
4,4'-dihydroxy-3,3'-tetramethylbiphenyl;
2,4'-dihydroxy benzophenone;
4,4'-dihydroxydiphenyl sulfone;
2,4-dihydroxy diphenyl sulfone;
4,4'-dihydroxy diphenyl sulfoxide;
4,4'-dihydroxy diphenyl sulfide;
3,4-dihydroxydiphenylmethane;
4,4'-dihydroxybenzophenone;
4,4'-dihydroxydiphenylether;
hydroquinone;
resorcinol; etc.

In the practice of the method of invention, solution polymerization reaction is effected between the organic diamines of formula (II), and the aromatic bis(ether anhydride)s of formula (III), in the presence of a phenolic solvent. And melt polymerization take place when the diamines having phthalimides of formula (II) react with bis(ether anhydride)s of formular (III), at 250°~300° C. for 0.5~2 hours.

In order to provide optimum contact between the aromatic bis(ether anhydride) and the organic diamine having phthalimides the reaction mixture can be agitated such as by stirring, etc. Substantially equal moles of reactants have been found to provide for optimum molecular weight of polymer; however, there can be employed from 0.5 to 2 moles and preferably 0.9 to 1.1 moles of aromatic bis(ether anhydride) per mole of organic diamines having phthalimides.

Recovery of polyetherimideimide can be effected by pouring the polymer solution upon cooling into a precipitant such as methanol, etc., followed by washing, filtering, etc.

The nucleophilic substitution reaction is to synthesize metal salt of diol by reacting diol with equivalent ratio of 50% metal hydroxide solution using dipolar aprotic solvent such as dimethyl sulfoxide, dimethylformamide, etc., under nitrogen gas and removing of the water produced during the reaction using azeotropic method, and then further removing water completely by continuous reflux using $CaH_2$ tube. After reaction the metal salt of diol with equal equivalent of dinitro-compound having imideimide group of the formula (IV) with stirring from 0.5 to 20 hours, the reaction is then stopped by neutralizing with acetic acid. At the termination of the reaction, recovery of polyetherimideimide can be effected by pouring the polymer solution upon cooling into a precipitant such as methanol etc., followed by washing, filtering, etc.

Metal salts of diol of the formula (V) may be also used for reaction after generated by direct reaction with metal and stored in anhydrous condition. In order that those skilled in the art will be able to practice the invention, the following examples are given by way of illustration and not by way of limitation. All parts are by weight.

EXAMPLES 1–7

A mixture of 10 parts of 1,3-bis(4-nitrophthalimido)-benzene 500 parts of r-butyrolactone and 0.5 parts of 10% Pd/C on active carbon was stirred in hydrogenation apparatus.

The reaction was conducted at a pressure of 50 psi for 4 hours at room temperature and also for 2 hours heating to 60° C. After removing the catalyst by filteration in the hot state, a yellow crystal was obtained by cooling the filterate. The said crystal was washed with ethanol, recrystalized in r-butyrolactone, and dried.

The product had a melting point of 342°~343° C. Based on method of preparation and its infrarad spectrum, the product was a aromatic diamine having phthalimide of the formula

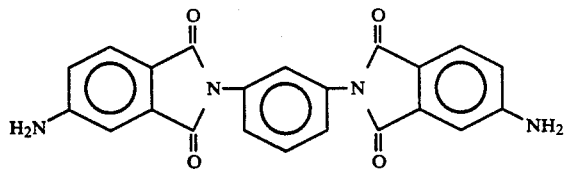

Following the same procedure, there were made other aromatic substituted diamine which are shown below in Table I.

TABLE I

| Example | R | Yield (%) | M.P (°C.) |
| --- | --- | --- | --- |
| 1 | 1,3-phenylene | 81 | 342~343 |
| 2 | 4,4'-diphenylmethane | 87 | 368~369 |
| 3 | 4,4'-diphenylether | 96 | 233~234 |
| 4 | 1,4-phenylene | — | — |
| 5 | 4,4'-diphenylsulfone | 95 | — |
| 6 | 1,5-naphthalene | 88 | 301 dec. |
| 7 | 4-methyl-1,3-phenylene | 79 | 370~371 |

EXAMPLE 8

After mixing $2.5 \times 10^{-2}$ mole 1.3-bis (4-amino phthalimido) benzene with 60 ml N-methylpyrrolidone and dissolving at 190° C., 0.1 mole 4-nitrophthalic anhydride was slowly added. The reaction mixture was under reflux for 2 hours and then the water produced during the reaction was removed by generating a azeotropic mixture with addition of toluene 5 ml which was, in turn, removed. After cooling the reactor, filtering the product and drying.

Product was obtained by recrystalization with N-methylpyrrolidone.

The product was obtained at a yield of 20.4%. Analysis: Calculated for $C_{38}H_{16}N_6O_{12}$, C, 60.97; H, 2.15; N, 11.22. Found: C, 60.97; H, 2.15; N, 11.33. Based on the method of preparation, the above elemental analysis and its infrarad spectrum of the product was identified 1,3-bis(4-nitrophthalimido-4-phthalimido)benzene.

EXAMPLE 9

A mixture of 100 ml m-cresol, 10.4 g (0.02 mole) 4,4'-(2,2'-diphenylpropane)-bis phthalic anhydride (hereinafter identified as "BEA") and 8.24 g (0.02 mole) 1,3-bis(4-aminophthalimido)benzene was heated to reflux for 30 minutes. After adding 40 ml of toluene, the water was continuously removed by azeotropic distillation for 20 hours after removing the toluene, it was again allowed to react for 2.5 hours at 200° C.

The mixture was allowed to cool to 160° C., the reaction was stopped by adding 1 mole % aniline. The reaction product was precipitated in methanol, dried and dissolved in chloroform, then reprecipitated in methanol and dried, the polymer PEII-B(I) is obtained. The yield was 92.1% and the characteristic viscosity was found to be 0.30 dl/g by measuring with concentration of 0.5 g/dl at 30° C. in m-cresol.

Anal. Calc. for $C_{53}H_{30}N_4O_{10}$ C, 72.11; H, 3.40; N, 6.35. Found; C, 72.20; H, 3.50; N, 6.41.

Tg, 237° C.; TGA ($N_2$), 510° C.

The indentity of the PEII-B(I) was confirmed by its IR spectrum and $^1$H-NMR spectrum.

EXAMPLE 10

This example performed, by the same method as used in example 9, wherein PEII-MD was obtained by polymerization using 9.6 g (0.02 mole) 4,4'-bis(4-aminophthalimido)diphenylmethane among diamine having phthalimide group of the above formula (II). The yield was 96% and its characteristic viscosity was found to be 0.30 dl/g by measuring with concentration of 0.5 g/dl at 30° C. in m-cresol.

Anal. Calc. for $C_{60}H_{36}N_4O_{10}$ C, 74.07; H, 3.70; N, 5.76. Found; C, 74.14; H, 3.80; N, 5.80.

Tg, 225° C.; TGA($N_2$), 510° C.

The identity of the PEII-MD was confirmed by its IR spectrum and $^1$H-NMR spectrum.

EXAMPLE 11

This example performed, by the same method as used in example 9, wherein PEII-OD was obtained by polymerization, using 4.8 g (0.02 mole) 4.4'-bis(4-aminophthalimido)diphenylether among diamine having phthalimide group of the above formula (II). The yield was 93.6% and its characteristic viscosity was found to be 0.71 dl/g, by measuring with a concentration of 0.5 g/dl at 30° C. in m-cresol.

Anal. Calc. for $C_{59}H_{34}N_4O_{11}$; C, 68.57; H, 3.70; N, 11.42. Found; C, 67.86; H, 3.69; N, 11.57.

Tg, 231° C.; TGA($N_2$), 522° C.

EXAMPLE 12

This example performed, by the same method as used in example 9, wherein PEII-b was obtained by polymerization, using 7.96 g (0.02 mole) 1.4-bis(4-aminophthalimido)benzene was used for polymerization among diamine containing phthalimide group with the above formula (II). The precipitate was dried, dissolved again in m-cresol, reprecipitated in methanol and dried. The yield was 94.2% and its characteristic viscosity was found to be 0.37 dl/g by measuring with a concentration of 0.5 g/dl at 30° C. in m-cresol.

Anal. Calc. for $C_{53}H_{30}N_4O_{10}$ C, 72.11; H, 3.40; N, 6.35. Found C, 72.13; H, 3.55; N, 6.40.

Tg, 227° C.; TGA($N_2$), 504° C.

The identity of the PEII-b was confirmed by its IR spectrum and $^1$H-NMR spectrum.

EXAMPLE 13

This example performed, by the same method as in example 9, wherein PEII-SD was obtained by polymerization using 10.76 g (0.02 mole) 4.4'-bis(4-aminophthalimido)diphenylsulfone was used for polymerization among diamine containing phthalimide group with the above formula (II). The yield was 95% and its characteristic viscosity was found to be 0.29 dl/g by measuring with a concentration of 0.5 g/dl at 30° C. in m-cresol.

Anal. Calc. for $C_{59}H_{34}N_4O_{12}S_1$; C, 69.28; H, 3.33; N, 5.48. Found C, 68.95; H, 3.52; N, 5.55.

Tg, 251° C.; TGA($N_2$), 504° C.

The identity of the PEII-SD was confirmed by its IR spectrum and $^1$H-NMR spectrum.

EXAMPLE 14

This example performed, by the same method as in example 9, wherein PEII-N was obtained by polymerization using 8.96 g (0.02 mole) 1.5-bis(4-aminophthalimido)naphthalene among diamine having phthalimide group with the above formula (II). The yield was 86.3% and its characteristic viscosity was found to be 0.54 dl/g by measuring with a concentration of 0.5 g/dl at 30° C. in m-cresol.

Anal. Calc. for $C_{57}H_{32}N_4O_{10}$; C, 73.39; H, 3.43; N, 6.01. Found C, 73.20; H, 3.61; N, 5.84.

Tg, 276° C.; TGA($N_2$), 516° C.

The identity of the PEII-N was confirmed by its IR spectrum and $^1$H-NMR spectrum.

EXAMPLE 15

This example performed by the same method as in example 9, wherein

PEII-T was obtained by polymerization using 8.24 g (0.02 mole) 1,3-bis(4-aminophthalimido)-4-methylbenzene among diamine having phthalimide group with the above formula (II). The yield was 99.3% and its characteristic viscosity was found to be 0.27 dl/g by measuring with a concentration of 0.5 g/dl at 30° C. in m-cresol.

Anal. Calc. for $C_{54}H_{32}N_4O_{10}$; C, 72.32; H, 3.57; N, 6.25. Found C, 72.50; H, 3.74; N, 6.30.

Tg, 246° C.; TGA($N_2$), 500° C.

The identity of the PEII-T was confirmed by its IR spectrum and $^1$H-NMR spectrum.

EXAMPLE 16

A mixture of 3.2 g ($1.38 \times 10^{-2}$ mole) of Bisphenol A, 2.2 g (4.4 g 50% aqueous solution, $2.75 \times 10^{-2}$ mole) sodium hydroxide, 100 ml dimethylsulfoxide and 20 ml toluene was stirred in a nitrogen atmosphere at reflux over a Dean-Stark trap for 12 hours. It was replaced with calcium hydride tube and the reflux was continued. The little water was completely removed by passing the tube and the toluene was distilled.

The mixture was cooled to 135° C. to use for polymerization. 10 g ($1.34 \times 10^{-2}$ mole) 1,3-Bis(4-nitrophthalimido-4-phthalimido) benzene was added and then the mixture was allowed for 24 hours with violently stirring. The reaction was quenched by adding 0.4 g sodium-4-methylphenoxide and 0.7 ml acetic acid.

The product was precipitated in methanol and dried. The yield was 50.7% and characteristics of PEII-B(II) manutactured by the foregoing example 9, are as follows.

We claim
1. A polyetherimide-imide resin characterized by having imide-imide group with the following structural formula (I) and inherent viscosity ($\eta$inh) of 0.27~0.71 dl/g

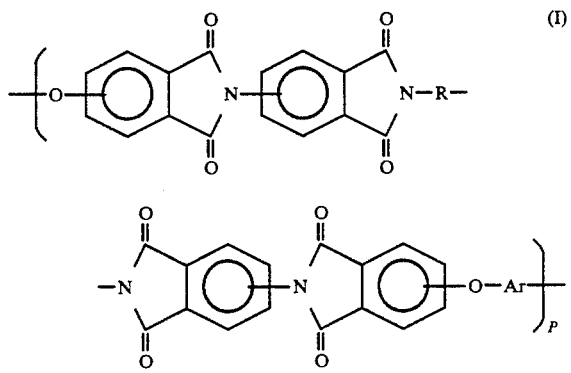

Wherein
R is selected from group of

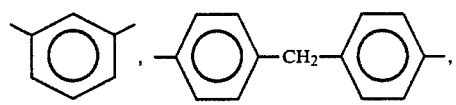

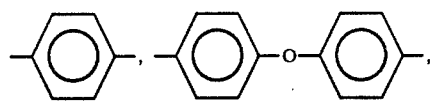

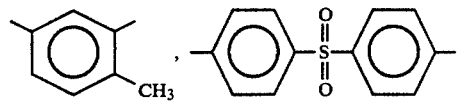

Ar is selected from alkyl group or phenyl derivatives with 6 to 12 carbons, and p is an integral number between 10 and 1000.

2. The polyetherimideimide resin as the defined in claim 1, characterized by having initial degradation occuring at 500°~522° C. and having a glass transition

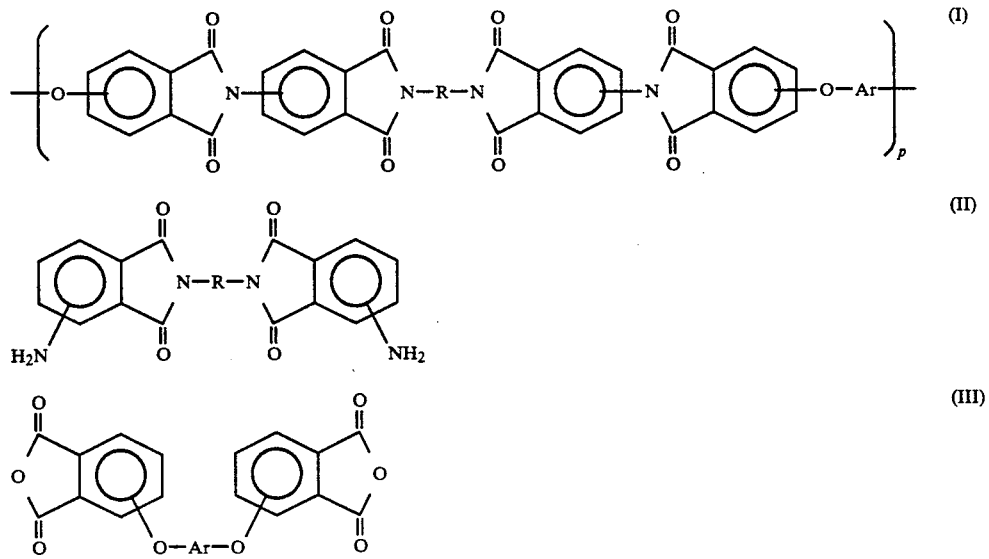

temperature(Tg) of 225°~276° C.

3. The polyetherimideimide resin as the defined in claim 1 characterized in which it is partially or wholly soluble in organic solvents selected among chloroform, dichloromethane, m-cresol, N,N'-Dimethylformamide and Dimethylsulfoxide.

4. A method of manufacturing polyetherimideimides with the following structural formula (I), consisting of: polymerizing a diamine compound having phthalimide group of the following structural formula (II), with equal molar quantities of dianhydride compounds having ether groups of the following structural formula (III)

Wherein, R, Ar and p are as defined in claim 1.

5. The method of manufacturing polyetherimideimides with the following structural formula (I) consisting of: nucleophilic substitution of dinitrophthalimideimides with the following structural formula (IV) and metal salt of diol of the following structural formula (V)

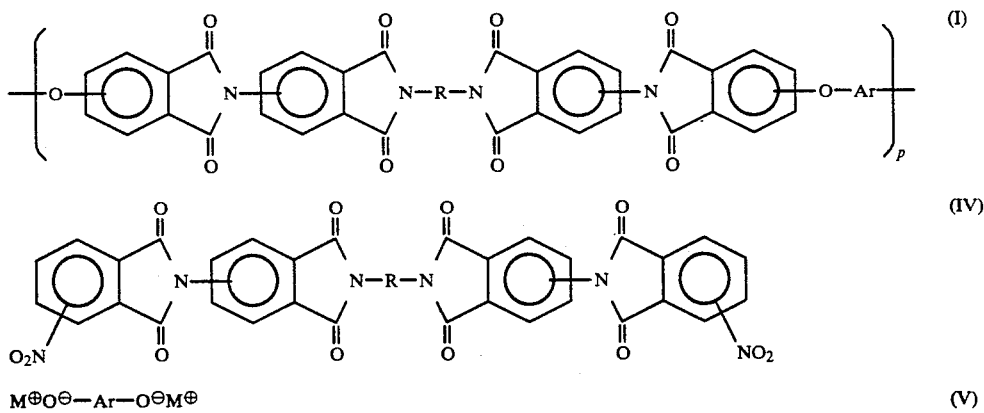

wherein, R, Ar and p are as according to claim 1 and M is a metal selected from sodium and potassium atom.

* * * * *